Figure 1:
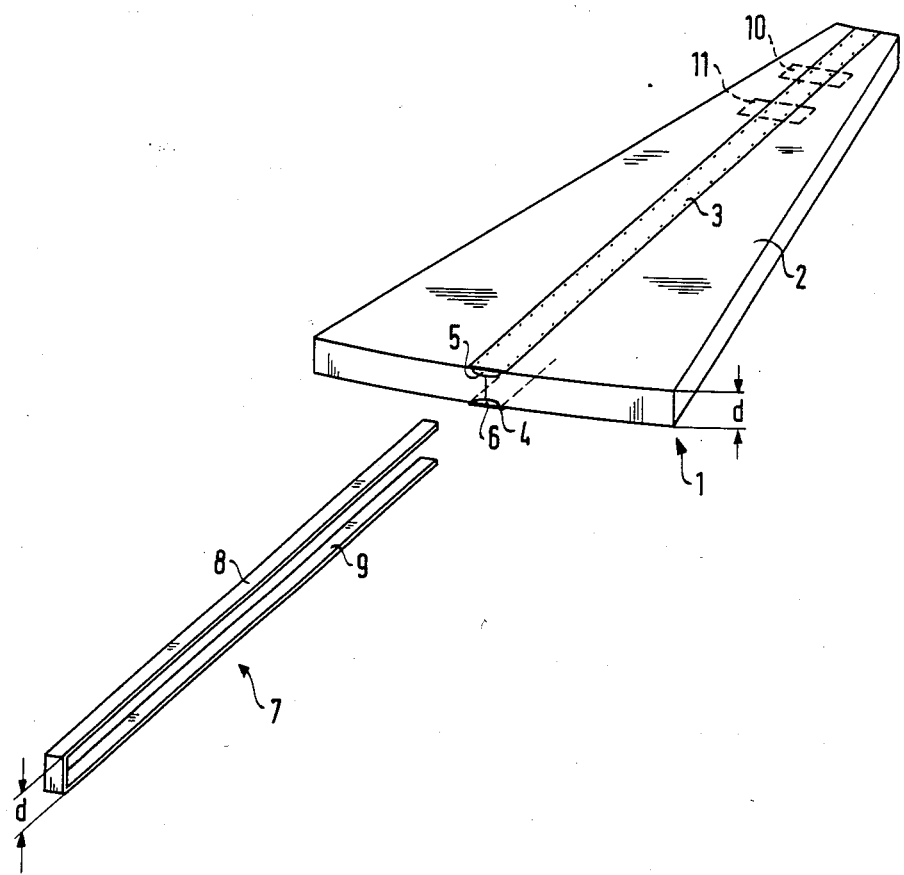

United States Patent [19]

Müller

[11] Patent Number: 4,578,192

[45] Date of Patent: Mar. 25, 1986

[54] FILTER CLOTH FOR A DISK FILTER

[76] Inventor: Hans-Rudolf Müller, Ostbühlstr. 49, CH-8038 Zürich, Fed. Rep. of Germany

[21] Appl. No.: 639,404

[22] Filed: Aug. 10, 1984

[30] Foreign Application Priority Data

Aug. 11, 1983 [DE] Fed. Rep. of Germany ....... 3329117

[51] Int. Cl.⁴ .............................................. B01D 25/02
[52] U.S. Cl. .................................................. 210/486
[58] Field of Search ............... 210/410, 411, 412, 486, 210/487; 55/365, 381, 379, 483

[56] References Cited

U.S. PATENT DOCUMENTS

| | | | |
|---|---|---|---|
| 1,240,385 | 9/1917 | Sweetland | 210/486 |
| 1,878,384 | 9/1932 | Davidson | 55/365 |
| 1,894,884 | 1/1933 | Page | 55/379 |
| 2,338,549 | 1/1944 | Shriver et al. | 210/486 |
| 3,165,473 | 1/1965 | Pall et al. | 210/487 |
| 3,807,146 | 4/1974 | Witkowski | 55/483 |
| 4,111,815 | 9/1978 | Walker et al. | 210/487 |

FOREIGN PATENT DOCUMENTS

| | | | |
|---|---|---|---|
| 1059010 | 3/1954 | France | 210/487 |
| 844440 | 8/1960 | United Kingdom | 210/487 |

Primary Examiner—Tim Miles
Attorney, Agent, or Firm—Fleit, Jacobson, Cohn & Price

[57] ABSTRACT

The invention relates to a filter cloth for disk filters with in particular sector-shaped filter cells from a filter cloth. Into this filter cloth are directly integrated reinforcements in the form of U-shaped clips, where they are fixed in seams or hollow seams or loops.

11 Claims, 5 Drawing Figures

FILTER CLOTH FOR A DISK FILTER

The invention relates to a filter cloth for a disk filter with in particular sector-shaped filter cells having reinforcements.

As is known, in the case of disk filters, it is necessary to remove at the end of a filtering cycle the filter cake which has grown up on the filter cloth during the filtering process. This is generally carried out with compressed air, which is blown into the inner area of the filter cell. The compressed air blast acting on the filter cloth during this blowing in procedure should have a very steep step of the compressed air rise profile, so that the filter cake can be completely detached from the filter cloth. However, excessive bulging of the filter cloth is not desired, because an excessive air quantity must be blown into the cell. This means a high air consumption and consequently an undesired energy consumption. In addition, the blowing time becomes too long, so that it is not possible to operate at high speeds. The overlap time is not sufficient for filling the inner area of the bag with air. Another disadvantage is that large bulges also give rise to high stresses within the filter cloth which reduce the service life thereof.

Another disadvantage of the excessively bulging filter cloth is that the air cannot escape fast enough and consequently the filter cloth passes through the scraper in the inflated state and grazes along the same.

Thus, such a disk filter has two perforated plates or strainers, on to which the filter cloth is fixed by means of clamping strips. The latter can have a radial and/or arcuate and/or star-like and/or plate-shaped configuration. However, the essential point in the case of this disk filter is that in addition to the perforated plates, clamping strips are also required for fixing the filter cloth in order to prevent excessive bulging of the latter. A reequipping of existing filter systems causes problems, because perforated plates and clamping strips must be correspondingly adapted, so that the undesired excessive bulging is prevented.

The problem of the invention is therefore to provide a filter cloth, in connection with which it is possible to prevent excessive bulging in simple manner during the compressed air action for removing the filter cake.

According to the invention this problem is solved in that the reinforcements are directly integrated into the fabric of the filter cloth.

Thus, in the case of the present invention, there is no need for cooperation between clamping strips and perforated plates, in order to obtain the desired reinforcements for the filter cloth. Instead, the reinforcements are directly integrated into the filter cloth, so that when reequipping an existing filter system, it is merely necessary to adapt the filter cloth with its reinforcements to the said system.

According to an advantageous further development of the invention, the reinforcements comprise U-shaped clips or clamps made from metal or plastic or some other rigid material, whose leg or end spacing is adapted to the disk filter segment thickness. The clips can have a flat or a circular profile.

The legs of these clips are, for example, fixed in a seam formed by the joint of two filter bag or pouch halves, or in a hollow seam obtained by sewing a strip-like piece of fabric on to the filter cloth fabric, or in loops provided on the filter cloth fabric. As a result it is possible in simple manner to integrate the clips forming the reinforcements to the filter cloth fabric. It is sufficient if the free ends or legs of the clips are introduced into the seams, hollow seams or straps and this simultaneously leads to a fixing of the disk filter segment thickness.

In addition, the ends of the clip legs can be fixed by straps, which leads to a paticularly reliable connection between the fabric and the clips. It is also possible to fix the ends of the clip legs by a further clip or buckle fitted to the outside of the filter cloth fabric.

The reinforcements can be directed in a radial or an arcuate manner. All that is important is that the reinforcements are guided in such a way that excessive bulging of the filter cloth is prevented during the compressed air action.

The reinforcements can also be firmly incorporated into the fabric, i.e. the reinforcements in the form of flat or circular profiles can be firmly or fixedly sewn into the hollow seams of the fabric.

It is finally also possible for a filter cell to have several reinforcements, which is particularly the case if said cell has a relatively large surface area, so that large bulges are to be feared.

The material for the reinforcements or clips are chosen as a function of the intended use of the disk filter. If the disk filter is to be used for treating particularly aggressive materials, then the reinforcements are appropriately made from top-quality steel or a suitable plastic.

The filter cloth according to the invention can also be used together with a perforated plate or strainer, on whose surface it is placed. This is particularly the case if the disk filter has a relatively large diameter. However, such a perforated plate is not necessary for smaller diameters.

If the perforated plate has a concave configuration, so that the volume to be filled with compressed air is kept very small, then the reinforcements should also be concave corresponding to the perforated plate, so that the filter cloth is adapted to the concave surface of the perforated plate.

The invention makes it possible to obtain a filter cloth for a disk filter, in which the reinforcements are directly integrated into the filter cloth fabric, so that there is no need to provide special measures consisting of the cooperation of the clamping strips and a perforated plate, merely for securing the filter cloth.

The invention is described in greater detail hereinafter relative to

FIGS. 1 to 5, each of which shows a sector-shaped filter cell of the filter cloth.

FIG. 1 shows a sector-shaped filter cell 1, which comprises a filter cloth 2 forming two filter bag halves. Through the sewing on of strip-like fabric pieces 3, 4 two hollow seams 5, 6 are formed, into which can be introduced a clip 7 made from metal or plastic or some other rigid material having a flat profile. This clip 7 has a U-shaped construction and has legs 8, 9, each of which is fixed into one of the hollow seams 5, 6. The distance d between legs 8, 9 of clip 7 is precisely adapted to the disk filter segment thickness d. Thus, when legs 8, 9 of clip 7 are introduced into hollow seams 5, 6 of filter cell 1, then the segment thickness of the latter is reinforced by clip 7.

In addition, at the head end of filter cell 1 it is e.g. possible to provide two straps 10, 11, which particularly reliably fix the ends of legs 8, 9 of clip 7.

Straps 10 and 11 are applied to the filter segment made from plastic, metal or some other appropriate material, so that the leg ends of the clip acquire an additional hold. It is also possible to provide an additional clip or buckle on the outside of the fabric, to ensure that the ends of legs 8, 9 of clip 7 are particularly well fixed.

Figure 2:
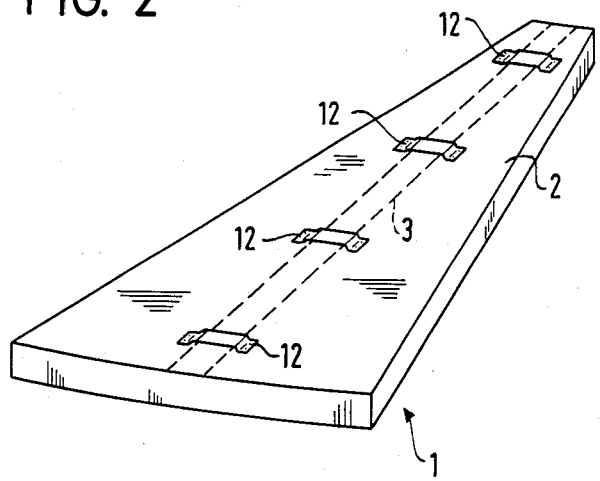

FIG. 2 shows another embodiment of the invention, in which leg 3 of clip 7 is secured by loops 12, which are sewn on to the surface of filter cloth 2. It is obviously also possible to provide these loops 12 on the inside of filter cloth 2.

Figure 3:
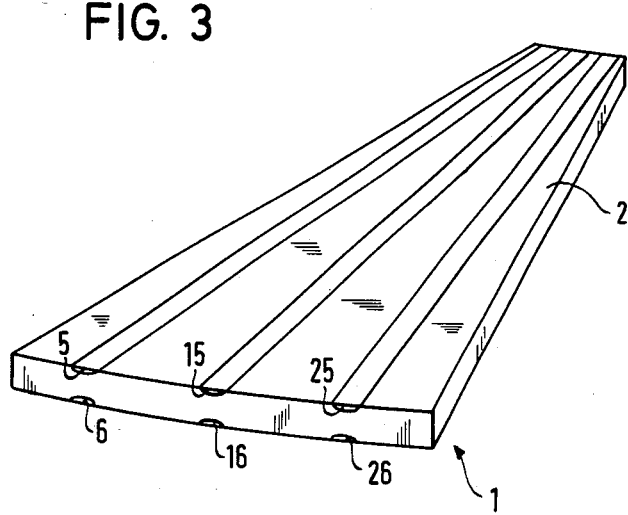

FIG. 3 shows a filter cell with a particularly large filter segment surface. In order to obtain the desired reinforcement, said filter segment surface is subdivided by several hollow seams 5, 6, 15, 16 and 25, 26. In place of said hollow seams, it is obviously also possible to use loops in accordance with the embodiment of FIG. 2.

Figure 4:
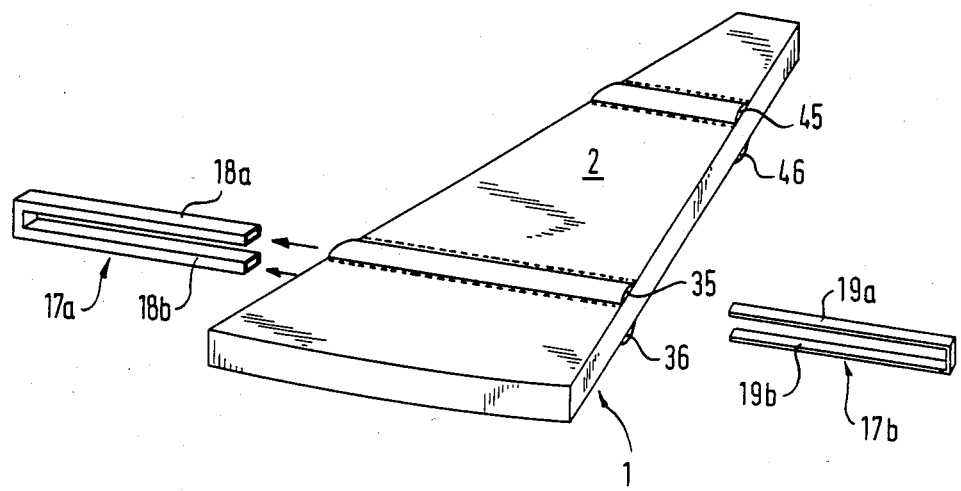

FIG. 4 shows an embodiment of the invention in which the hollow seams 35, 36 and 45, 46 for receiving the reinforcements are arcuate and not radial as in the other embodiments. It would also be possible to provide such arcuate reinforcements in addition to radial reinforcements. The U-shaped legs 18a, 18b of the U-shaped fork 17a are introduced into the hollow seams 35, 36 from one side, whilst the U-shaped legs 19a, 19b of U-shaped fork 17b are inserted from the other side. The free ends of the two U-shaped legs 19a 19b pass at the points indicated by arrows into the frontal openings of the U-shaped legs 18a, 18b, which are constructed as hollow profiles. In the case of an adequate rigidity of the clips, no additional holding support is required in this embodiment, because the two clips reciprocally secure one another.

Figure 5:
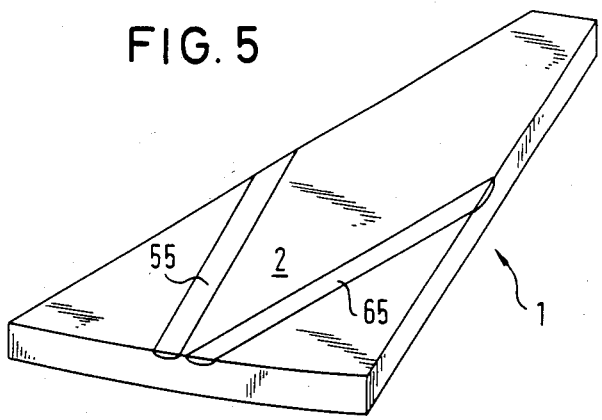

FIG. 5 shows another embodiment of the invention, in which the hollow seams 55, 65 run in V-shaped manner from a common point on the circumference of filter cell 1 towards the centre of the disk. This embodiment is particularly advantageous for very wide filter cells. Thus, a particularly large surface of the filter cell is so subdivided by the embodiment of FIG. 5 that no large bulge can form.

I claim:

1. A device for use with a disk filter cell, said device comprising:
   filter cloth means for use with a sector-shaped disk filter cell; and
   reinforcement means directly integrated into said filter cloth means, said reinforcement means being U-shaped clamps made from metal, plastic, or some other rigid material, and a leg spacing of said U-shaped clamps being adapted to the sector-shaped disk filter cell thickness.

2. A device according to claim 1, wherein the clamps have a flat or circular profile.

3. A device according to claim 1, wherein the legs of the clamps are fixed in a seam formed by the joint of two filter bag halves.

4. A device according to claim 1, wherein the legs of the clamps are in each case fixed in a hollow seam obtained by sewing a striplike piece of fabric on to the filter cloth fabric.

5. A device according to claim 1, wherein the legs of the clamps are fixed in loops provided on the filter cloth fabric.

6. A filter cloth according to claim 1, wherein the reinforcement means are firmly or fixedly incorporated into the fabric.

7. A filter cloth according to claim 1, wherein the reinforcement means are radial and/or arcuate.

8. A filter cloth according to claim 1, wherein one filter cell has several reinforcements.

9. A filter cloth according to claim 1, wherein at least two reinforcements run in V-shaped manner towards a centre of the disk filter cell from a common point on an outer circumferential edge of the disk filter cell.

10. A filter cloth according to claim 1, wherein the U-shaped clamps are constructed as forks, which can be telescoped into one another, which engage from their edges over the filter cell and whose free U-shaped legs overlap in a telescoped region.

11. A filter cloth according to claim 10, wherein the U-shaped clamps are circumferentially arranged.

* * * * *